United States Patent
Hamerly et al.

(10) Patent No.: US 7,411,500 B2
(45) Date of Patent: Aug. 12, 2008

(54) METHODS OF MONITORING ITEMS OR MATERIAL FROM MANUFACTURING PROCESSES

(75) Inventors: Michael E. Hamerly, Vadnais Heights, MN (US); Barry W. Kostyk, Stillwater, MN (US); Robert D. Lorentz, North Oaks, MN (US); Robert A. Sainati, Bloomington, MN (US); James P. McGee, Cedar, MN (US); Subhalakshmi M. Ananthanarayanan, Woodbury, MN (US); John W. Van Bogart, Minneapolis, MN (US); Ronald D. Jesme, Plymouth, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 295 days.

(21) Appl. No.: 11/226,102

(22) Filed: Sep. 14, 2005

(65) Prior Publication Data
US 2007/0057789 A1    Mar. 15, 2007

(51) Int. Cl.
*G08B 13/14* (2006.01)
(52) U.S. Cl. .................. 340/572.1; 340/572.4; 340/10.1
(58) Field of Classification Search .............. 340/572.1, 340/572.4, 572.8, 572.9, 539.11, 10.1; 700/116, 700/115; 701/23, 200, 201; 426/108, 118
See application file for complete search history.

(56) References Cited

U.S. PATENT DOCUMENTS

| | | | |
|---|---|---|---|
| 4,814,742 A | 3/1989 | Morita et al. | |
| 5,771,003 A | 6/1998 | Seymour | |
| 5,785,181 A | 7/1998 | Quartararo, Jr. | |
| 5,963,134 A | 10/1999 | Bowers et al. | |
| 6,195,006 B1 | 2/2001 | Bowers et al. | |
| 6,232,876 B1 | 5/2001 | Maloney | |
| 6,362,738 B1 | 3/2002 | Vega | |
| 6,399,258 B2 | 6/2002 | O'Brien et al. | |
| 6,805,940 B2 | 10/2004 | Koskenmaki et al. | |
| 6,816,125 B2 | 11/2004 | Kuhns et al. | |
| 7,047,103 B2* | 5/2006 | Hornbaker et al. | 700/225 |
| 7,069,100 B2* | 6/2006 | Monette et al. | 700/116 |
| 7,119,689 B2* | 10/2006 | Mallett et al. | 340/572.1 |
| 7,136,721 B2* | 11/2006 | Sano et al. | 700/215 |
| 7,162,328 B2* | 1/2007 | Hornbaker et al. | 700/213 |
| 2002/0018880 A1 | 2/2002 | Young | |
| 2002/0111819 A1 | 8/2002 | Li et al. | |

(Continued)

FOREIGN PATENT DOCUMENTS

AU    2003244560 A1    10/2003

(Continued)

OTHER PUBLICATIONS

PCT International Search Report, PCT/US06/35763, Sep. 13, 2007.

*Primary Examiner*—Van T. Trieu
(74) *Attorney, Agent, or Firm*—John A. Burtis

(57) ABSTRACT

Methods of monitoring items and/or materials from a manufacturing process. One embodiment of the invention provides a method of monitoring items and/or materials from a manufacturing process using a plurality of RFID tagged containers, and a plurality of stations associated with different portions of the manufacturing process, where each station includes an RFID reader.

33 Claims, 4 Drawing Sheets

U.S. PATENT DOCUMENTS

| | | |
|---|---|---|
| 2003/0030568 A1 | 2/2003 | Lastinger et al. |
| 2003/0102367 A1 | 6/2003 | Monette et al. |
| 2003/0151028 A1 | 8/2003 | Lawrence et al. |
| 2004/0175515 A1 | 9/2004 | Lawrence et al. |
| 2006/0006999 A1 | 1/2006 | Walczyk et al. |
| 2006/0055552 A1 | 3/2006 | Chung et al. |

FOREIGN PATENT DOCUMENTS

| | | |
|---|---|---|
| CN | 1293732 A | 5/2001 |
| CN | 1315027 A | 9/2001 |
| DE | 198 42 752 | 4/2000 |
| DE | 19856762 | 5/2000 |
| DE | 100 18 167 | 10/2001 |
| DE | 203 05 299 | 11/2003 |
| EP | 0 773 087 | 5/1997 |
| EP | 1 316 864 | 4/2003 |
| JP | 2002-157008 | 5/2002 |
| JP | 2002-81848 | 3/2003 |
| JP | 2003-205430 | 7/2003 |
| JP | 2003-271216 | 9/2003 |
| WO | WO 99/64974 | 12/1999 |
| WO | WO 00/13515 | 3/2000 |
| WO | WO 00/42678 | 7/2000 |
| WO | WO 01/06401 A1 | 1/2001 |
| WO | WO 01/26048 A2 | 4/2001 |
| WO | WO 01/63368 | 8/2001 |
| WO | WO 01/80146 | 10/2001 |
| WO | WO 01/82009 | 11/2001 |
| WO | WO 02/33511 | 4/2002 |
| WO | WO 02/103645 A2 | 12/2002 |
| WO | WO 03/038748 | 5/2003 |
| WO | WO 2004/074964 A2 | 9/2004 |

* cited by examiner

METHODS OF MONITORING ITEMS OR MATERIAL FROM MANUFACTURING PROCESSES

TECHNICAL FIELD

The present invention relates to methods of monitoring items and/or materials from a manufacturing process using radio frequency identification ("RFID") technology. One embodiment of the invention provides a method of monitoring items and/or materials from a manufacturing process using a plurality of RFID tagged containers, and a plurality of stations associated with different portions of the manufacturing process, where each station is associated with an RFID reader.

BACKGROUND OF THE INVENTION

Various methods associated with manufacturing processes are known. For example, U.S. Patent Publication No. 2003/0102367, "Automated Manufacturing Control System" (Monette et al.) describes an automated manufacturing control system which claims to reduce human interaction relative to the data transfer, physical verification, and process control associated with the movement of components, tooling, and operators in a manufacturing system. PCT Publication No. WO 01/80146, "Product and Material Information Communication in Manufacturing Processes" (Avni) describes a product and material information communication system particularly for use in manufacturing processes comprising a product package or support having an RFID tag including data memory means for storing at least a unique identification code for the product and at least dynamic and/or static data associated with characteristics of the product which are related to use of the product in an intended manufacturing process and an interrogator for retrieving the identification code and product characteristic information and providing such product information to process control equipment for optimizing the operation thereof. Japanese Patent Publication No. 2003-271216, in its abstract, describes a problem to be solved as to record production history up to each component constituting a finished product with respect to each finished product, and to make use of the production history in process control, etc. Continuing in its English-translated abstract, Japanese Patent Publication No. 2003-271216 describes a solution as a process control method using a non-contact IC tag which is installed in a material, and is provided with radio antenna for signal transmission/reception, and a circuit for receiving a signal from a reader and for transmitting a responding signal to an interrogator. The process control method using the non-contact IC tag includes a step for receiving an interrogation signal transmitted from the interrogator, a step for obtaining information on the material on the basis of the responding signal from the non-contact IC tag, and a step for performing the process control on the basis of material information.

Other manufacturing methods are well known in the art. For example, manufacturers have been known to use bar codes on containers for use with their manufacturing processes. These containers with bar codes are for receiving and transporting byproducts, semi-finished goods, waste generated by their manufacturing processes to other locations. These containers with bar codes are also for receiving and transporting raw materials and finished goods. Sometimes, when the containers are holding waste, the containers and their waste contents are weighed and the weight is recorded along with the bar code affiliated with the container.

SUMMARY OF THE INVENTION

One aspect of the present invention provides a method of monitoring items and/or materials from a manufacturing process. The method comprises the steps of: providing a manufacturing process, where the manufacturing process includes a plurality of stations associated with different portions of the manufacturing process, where each station includes a radio frequency identification ("RFID") reader associated with the station;

providing a plurality of RFID tagged containers, where each container has an associated RFID tag; locating at least one of the RFID tagged containers at least at one of the stations; filling at least a portion of the RFID tagged container with items and/or materials generated from the manufacturing process; interrogating the RFID tagged container with the RFID reader associated with the station to at least record the location of the station where the RFID tagged container is located, and recording the time of the interrogation; obtaining information about the items and/or materials that were placed in the RFID tagged container at the station; and deciding what action to perform with the items and/or materials in the RFID tagged container.

In one embodiment of the above method, the manufacturing process is a first manufacturing process for manufacturing a first finished good and the plurality of stations are for receiving semi-finished goods, byproducts, or waste generated from the manufacturing process, and where the filling step comprises: filling at least a portion of the RFID tagged container with at least a semi-finished good, byproduct, or waste generated from the manufacturing process at the station. In one aspect of this embodiment, the filling step comprises: filling at least a portion of the RFID tagged container with semi-finished goods generated from the first manufacturing process; and where the deciding step comprises: transporting the semi-finished goods to temporary storage. In another aspect of this embodiment, the filling step comprises: filling at least a portion of the RFID tagged container with byproducts generated from the first manufacturing process; and where the deciding step comprises: transporting the byproducts to a second manufacturing process that is for manufacturing a second finished good, where the byproducts from the first manufacturing process may be used as raw materials in the second manufacturing process. In yet another aspect this embodiment, the filling step comprises: filling at least a portion of the RFID tagged container with waste generated from the first manufacturing process; and where the deciding step comprises: weighing the waste in the RFID tagged container, recording the weight, and emptying the RFID tagged container.

In another embodiment of the above method, the interrogation step further includes recording the date the RFID tagged container was located at the station. In another embodiment of the above method, the method further comprises the step of notifying a user of where to take the items and/or materials in the RFID tagged container after it leaves the station. In another embodiment of the above method, the method further comprises the step of issuing an alert, if the user takes the RFID tagged container to a wrong location. In another embodiment of the above method, the method further comprises the step of issuing an alert, if one of the plurality of stations contains an incorrect number of RFID tagged containers. In another embodiment of the above method, the deciding step comprises transporting the RFID tagged container to another location.

Another aspect of the present invention provides an alternative method for tracking semi-finished goods, byproducts of the manufacturing process, or waste from a manufacturing process. This alternative method comprises the steps of: providing a first manufacturing process for manufacturing a first finished good, where the manufacturing process includes a plurality of stations for receiving semi-finished goods, byproducts, or waste generated from the manufacturing process, where each station includes a radio frequency identification ("RFID") reader associated with the station; providing a plurality of RFID tagged containers, where each container has an associated RFID tag; locating at least one of the RFID tagged containers at least at one of the stations; filling at least a portion of the RFID tagged container with at least a semi-finished good, byproduct, or waste generated from the manufacturing process at the station; interrogating the RFID tagged container with the RFID reader at the stations; obtaining information about the goods, byproducts or waste in the RFID tagged container; and deciding what action to perform with the semi-finished goods, byproducts, or waste in the RFID tagged containers.

In one embodiment of the above method, the filling step comprises: filling at least a portion of the RFID tagged container with semi-finished goods generated from the first manufacturing process; and where the deciding step comprises: transporting the semi-finished goods to temporary storage. In one aspect of this embodiment, the filling step comprises: filling at least a portion of the RFID tagged container with byproducts generated from the first manufacturing process; and where the deciding step comprises: transporting the byproducts to a second manufacturing process that is for manufacturing a second finished good, where the byproducts from the first manufacturing process may be used as raw materials in the second manufacturing process. In another aspect of this embodiment, the filling step comprises: filling at least a portion of the RFID tagged container with waste generated from the first manufacturing process; and where the deciding step comprises: weighing the waste in the RFID tagged container, recording the weight, and emptying the RFID tagged container. In another aspect of this embodiment, the interrogation step further includes recording the date the RFID tagged container was located at the station.

In another aspect of this embodiment, the method further comprises the step of notifying a user of where to take the items and/or materials in the RFID tagged container after it leaves the station. In another aspect of this embodiment, the method further comprises the step of issuing an alert if the user takes the RFID tagged container to a wrong location. In yet another aspect of this embodiment, the method further comprises the step of issuing an alert, if one of the plurality of stations contains an incorrect number of RFID tagged containers. In another aspect of this embodiment, the method further comprises the step of transporting the RFID tagged container to another location.

Another aspect of the present invention provides yet another alternative method of monitoring items and/or materials from a manufacturing process. This alternative method comprises the steps of: providing a manufacturing process, where the manufacturing process includes a plurality of stations associated with different portions of the manufacturing process, where each station includes a radio frequency identification ("RFID") reader associated with the station; providing a plurality of RFID tagged containers, where each container has an associated RFID tag; locating at least one of the RFID tagged containers at least at one of the stations; filling at least a portion of the RFID tagged container with items and/or materials generated from the manufacturing process at the station; interrogating the RFID tagged container with the RFID reader associated with the station to at least record the location of the station where the RFID tagged container is located, and recording the time of the interrogation; obtaining information about the items and/or materials that were placed in the RFID tagged container at the station; repeating the interrogating and obtaining steps multiple times to gather data over a length of time; and using the data to optimize or improve the manufacturing process.

In one embodiment of the above method, the manufacturing process is a first manufacturing process for manufacturing a first finished good and the plurality of stations are for receiving semi-finished goods, byproducts, or waste generated from the manufacturing process, and where the filling step comprises: filling at least a portion of the RFID tagged container with at least a semi-finished good, byproduct, or waste generated from the manufacturing process. In one aspect of this embodiment, the filling step comprises: filling at least a portion of the RFID tagged container with semi-finished goods generated from the first manufacturing process; and where the deciding step comprises: transporting the semi-finished goods to temporary storage. In another aspect of this embodiment, the filling step comprises: filling at least a portion of the RFID tagged container with byproducts generated from the first manufacturing process; and where the deciding step comprises: transporting the byproducts to a second manufacturing process that is for manufacturing a second finished good, where the byproducts from the first manufacturing process may be used as raw materials in the second manufacturing process. In yet another aspect of this embodiment, the filling step comprises: filling at least a portion of the RFID tagged container with waste generated from the first manufacturing process; and where the deciding step comprises: weighing the waste in the RFID tagged container, recording the weight, and emptying the RFID tagged container.

In yet another embodiment of the above method, the interrogation step further includes recording the date the RFID tagged container was located at the station. In another embodiment of the above method, the method further comprises the step of notifying a user of where to take the items and/or materials in the RFID tagged container after it leaves the station. In another embodiment of the above method, the method further comprises the step of issuing an alert, if the user takes the RFID tagged container to a wrong location. In another embodiment of the above method, the method further comprises the step of issuing an alert, if one of the plurality of stations contains an incorrect number of RFID tagged containers. In yet another embodiment of the above method, the deciding step comprises transporting the RFID tagged container to another location.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

Figure 1:
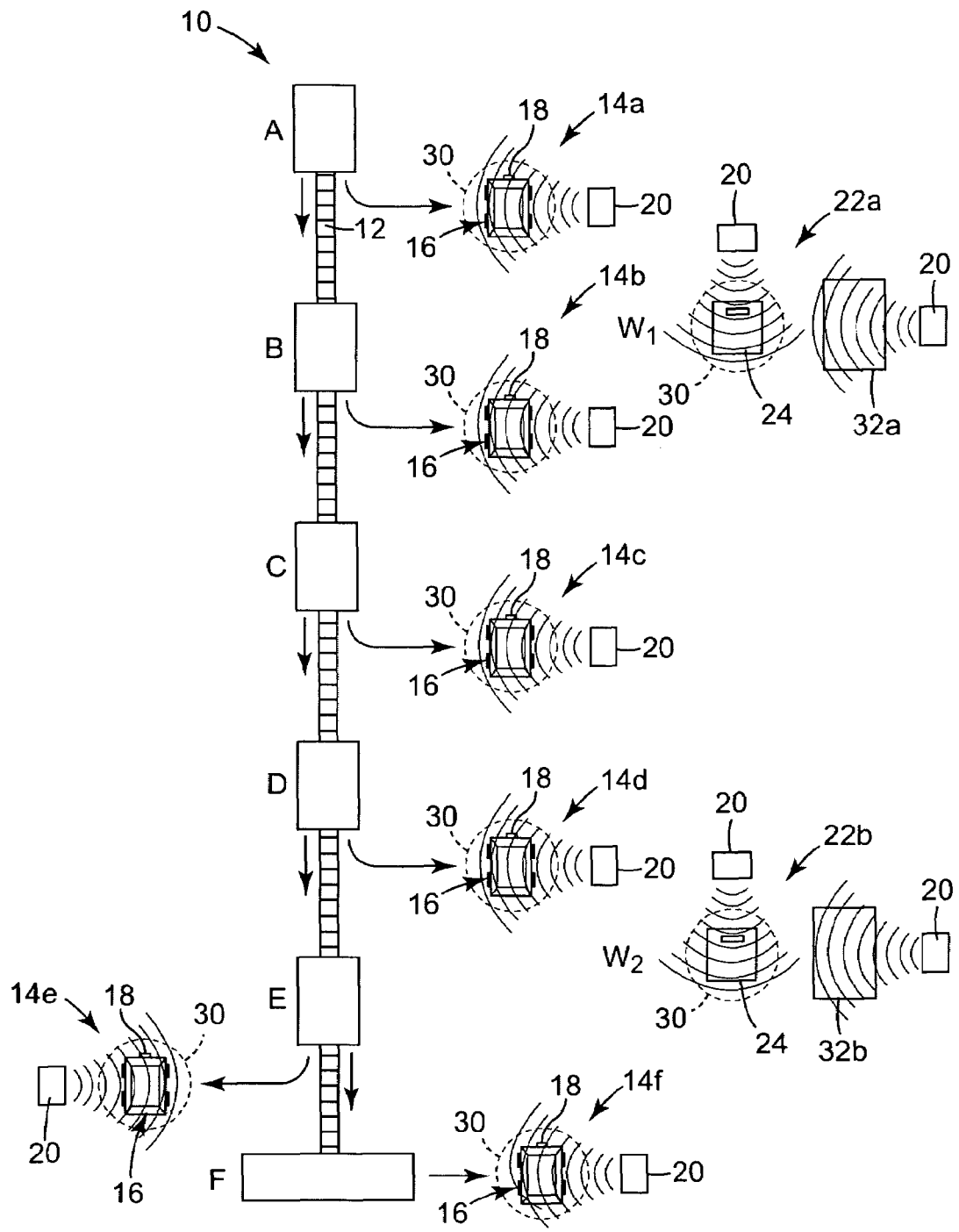
FIG. 1 is a perspective, schematic view of a manufacturing process that is useful for illustrating the methods of the present invention.

The present patent application describes various methods of using radio-frequency identification (RFID) technology to help track and trace various inputs or outputs of various portions of a manufacturing line, including the items and/or materials that are typically used by or generated during the manufacturing process, such as raw materials, finished goods, semi-finished goods, byproducts of the manufacturing process, and waste generated by the manufacturing process. These terms are used throughout the description and the claims that, while for the most part are well known, may require some explanation. It should be understood that the term "raw materials" refers to materials or other items that are used as input materials for the manufacturing process. "Finished goods" refers to goods or other items and/or materials which are ultimately produced by the manufacturing line, and which are typically ready for sale and delivery to the marketplace. "Semi-finished goods" refer to goods or other items and/or materials that are made, treated or sold to be ultimately used in making a finished good or product. "Byproducts" of the manufacturing process refers to something produced in the making of the semi-finished good or finished good, which may be a secondary result or be a side effect of the manufacturing process. Byproducts of one manufacturing process may also be used as raw materials or semi-finished goods of a different manufacturing process, as explained in more detail below. "Waste" refers to a typically useless or worthless byproduct of the immediate manufacturing process, which may be ultimately destroyed, recycled or used for some other purpose.

The methods of the present invention are useful for gathering accurate and reliable information or data related to manufacturing processes, in particular for gathering information on raw materials, finished goods, semi-finished goods, byproducts, and waste generated during the manufacturing processes, as such items and/or materials move within the manufacturer's facilities. The methods of the present invention are more accurate and reliable than previous bar code systems described in the Background of the Invention because there are several disadvantages to using bar codes on containers in certain manufacturing environments, in comparison to using RFID tags in the same environments. Bar codes must be visible to be properly read, which limits the locations in which they may be placed, and bar codes can easily be obscured, either accidentally or intentionally. For example, in certain manufacturing environments, the bar codes can become unreadable due to dirt, spills or other contamination to the bar codes. As another example, bar code labels may easily fall off the containers, if their adhesive becomes contaminated, degraded or nonfunctioning, which can happen often in a manufacturing environment. Use of bar code systems often require human intervention to properly function. For example, a person is often required to either position the bar code label on an item so a fixed bar code reader can properly read the bar code, or the person must position the reader relative to the bar code. Regardless, this reliance on human intervention often introduces the potential for errors to occur when information is being collected or the failure to properly scan the bar code at all. For most applications, the range at which a bar code detector can sense the bar code is also comparatively small. In some applications, multiple items may need to be processed, which under a bar code system requires that the items be processed one at a time. Further, once a bar code is printed and attached to an item, additional information generally cannot be added to the bar code. These constraints of bar code systems make them undesirable or inefficient for some applications, such as in certain manufacturing processes. Lastly, due to the unreliability of bar codes, particularly in the manufacturing environment, it is often difficult to rely on the information gathered using such bar code systems.

In contrast, RFID systems do not require line of sight to be properly read. Therefore, RFID tags can be automatically read without human intervention, and thus the information gathered is more reliable. Also, there are more options of where to place the RFID tags on containers and where to install the RFID readers. RFID tags may be installed on containers with certain protective features, which help protect the RFID tags from the harsh manufacturing environment. RFID tags can also be read at distances up to 100 feet, making them easier to use in manufacturing environments. It is possible to store additional information on RFID tags. Lastly, the information gathered from RFID systems is typically more reliable than information gathered from bar code systems.

The information or data gathered by the systems and methods described below provide manufacturers with valuable tools for them to truly understand what is occurring on their manufacturing lines, provide them with accurate data or information related to their manufacturing processes and provide them with opportunities to optimize or improve their manufacturing processes, to monitor compliance after improvements to their manufacturing processes have been implemented, and ultimately to optimize or improve their business processes.

The present patent application first discusses RFID technology generally, and then discusses the use of RFID technology in inventive systems or methods for monitoring items and/or materials generated from manufacturing processes or manufacturing lines. These new systems and methods are particularly useful for "lean manufacturing" initiatives, which is a term known in the industry directed towards systematic approaches to identify and eliminate unnecessary or excess time, inventory, space, people and money affiliated with manufacturing processes.

I. Radio-Frequency Identification (RFID) Technology

Radio-frequency identification (RFID) technology has become widely used in virtually every industry. A typical RFID system includes a plurality of RFID tags or labels, at least one RFID reader or detection system having an antenna for communication with the RFID tags or labels, and a computing device to control the RFID reader.

A conventional RFID tag may be an "active" tag or label that includes an internal power source, or a "passive" tag or label that is energized by the field created by the RFID reader antenna. Once energized, the RFID tags communicate using a pre-defined protocol, allowing the RFID reader to receive information from one or more RFID tags.

The combination of an integrated circuit, antenna, and substrate is commonly referred to in the art as an RFID tag. The antenna and integrated circuit are electrically attached to each other, and the combination of the antenna and integrated circuit are attached to the substrate. When the word "attached" is used herein, it is meant that ultimately the two items are attached to each other in any manner, even though there may be intermediate structures between the two items, they are still considered attached.

The integrated circuit provides the primary identification function. It may include software and circuitry to permanently store the tag's unique identification information and other desirable information, interpret and process commands received from the interrogation hardware, respond to requests for information by the interrogator, and assist the hardware in resolving conflicts resulting from multiple tags responding to interrogation simultaneously. Optionally, the integrated circuit may provide for updating the information stored in its memory (read/write) as opposed to just reading the information out (read only). Integrated circuits suitable for use in RFID tags include those available from Texas Instruments located in Dallas, Tex. (in their TIRIS or TAG-IT line of products), Philips Semiconductors located in Eindhoven, Netherlands (in their I-CODE, MIFARE and HITAG line of products), and ST Microelectronics located in Geneva, Switzerland, among others.

The RFID tag antenna geometry and properties depend on the desired operating frequency of the RFID tag. For example, 915 MHz or 2.45 GHz RFID tags would typically include a dipole antenna, such as a linear dipole antenna or a folded dipole antenna. A 13.56 MHz (or similar) RFID tag would typically use a spiral or coil antenna. However, other antenna designs are known to those skilled in the art. In either case, the antenna intercepts the radio frequency energy radiated by an interrogation source. This signal energy carries commands and in the case of a passive RFID tag, also provides power to the integrated circuit. With a passive RFID tag, the antenna enables the RF-responsive element on the integrated circuit to absorb energy sufficient to power the integrated circuit and thereby provide the response to be detected. Thus, the characteristics of the antenna should be matched to the system in which it is incorporated. Additional information about antennas is known to those of ordinary skill in the art from, for example, reference texts such as K. Finkenzeller, "RFID Handbook. Radio-Frequency Identification Fundamentals and Applications," (1999 John Wiley & Sons Ltd, Chichester, West Sussex, England).

The RFID reader typically includes a transmitter that may provide energy and information to the RFID tags, and a receiver to receive identity and other information from the RFID tags.

The computing device can control the operation of the RFID reader, which may include reading information from the RFID tag, writing information to the RFID tag, processing information obtained by the RFID reader, and interfacing with other systems. The computing device serves as an information management system by receiving the information from the RFID reader and performing some action, such as updating a database. In addition, the computing device may serve as a mechanism for programming data into the tags or labels via the transmitter.

A system that would enable the inventive methods of the present invention would typically also include software at the service, middleware and enterprise/reporting levels. Service software is used to control the operation of the readers, collect the data from the readers, and allow the data to be collected by the middleware software. Middleware software collects data from the service software, populates databases with these data and may optionally provide reports. Enterprise/reporting software typically integrates multiple data services to generate production reports, handle inventory management, shipping and receiving, billing and other operational tasks.

In general, the information received from an RFID tag is specific to the particular application, but often provides identification for an article to which the tag is affixed, such as the containers described below. Additional information may also be provided which is associated with the contents of the container to which the RFID tag is attached, which may come from other sources, such as other databases.

A variety of methods of making RFID tags, labels, and circuits are known, including the following: U.S. Pat. No. 6,805,940; U.S. Pat. No. 6,816,125; U.S. Pat. No. 6,399,258; U.S. Publication No. 2003/0151028; U.S. Publication No. 2004/0175515; PCT Publication WO 03/038748; PCT Publication WO 00/42678; and U.S. Publication No. 2002/0018880.

One example of a suitable RFID tag is commercially available from Identec Solutions, Inc. based in Kelowna, British Columbia, Canada under part number i-Q8. One example of a suitable RFID reader is also commercially available from Identec Solutions, Inc. under part number i-Port III.

II. Systems and Methods for Monitoring Items and/or Materials Used By or Generated From Manufacturing Processes Manufacturers of goods, products, or other items and/or materials generally seek to optimize or improve their manufacturing processes, reduce their overall unit cost for the items and/or materials they produce, maximize their revenues, improve their business processes and comply with regulatory requirements. To achieve these objectives, manufacturers will typically gather data or other information on different performance parameters affiliated with the efficiency of their manufacturing processes. For instance, manufacturers may gather information about how much waste, byproducts or semi-finished goods their current manufacturing processes generate, at which locations such waste, byproducts, or semi-finished goods are generated, and during what time frames. This information is helpful to the manufacturers to help them optimize or improve their manufacturing processes. Manufacturers may try to reuse or sell the waste or byproducts to be used in another manufacturing process, either owned by them or by others, to earn additional revenue to help offset manufacturing costs. For example, waste or byproducts generated by a first manufacturing process which is directed at making one finished product may be used as raw materials in a second, unrelated manufacturing process to make a different finished product. As another example, manufacturers may seek to understand the true manufacturing costs of their products, including costs attributable to waste or byproducts generated by their manufacturing processes, and to receive the information in a timely manner. As another example, manufacturers may seek to understand how long semi-finished goods are temporarily stored. Some semi-finished goods may have limited time during which they can be stored, due to regulatory issues, particularly in relationship to manufacturing processes for food products. As another example, manufacturers seek new methods of monitoring the residency or storage time of certain products during the manufacturing process, particularly for food products, as they are manufactured to comply with regulatory requirements, such as product shelf life. As yet another example, manufacturers seek new methods in assisting them with product recalls, particularly with identifying sub lot portions of their manufacturing processes. As another example, manufacturers seek new ways of monitoring compliance with standard operating procedures, or for maintaining improvements to both manufacturing and business process improvements. The systems and methods of the present invention described in the present patent application help provide manufacturers with the information they require to address all of theses scenarios, among others.

FIG. 1 illustrates a generic manufacturing process, which is useful for describing the methods of the present invention. Manufacturing process or manufacturing line 10 is represented by a series of various locations A-F, where manufacturing sub-processes or multiple steps are performed, which make up the manufacturing process. Conveyor belt 12 is representative of moving various items and/or materials between the locations A-F. However, any means known in the art may transport items and/or materials between the various processing locations. Raw materials for the manufacturing process 10 are typically feed into location A, where any number of steps may be performed on the raw materials. However, other raw materials or semi-finished goods may also be fed into the manufacturing line at locations other than location A. The output of location A is at least one of the inputs of location B. The output of location B is at least one of the inputs of location C. The output of location C is at least one of the inputs of location D. The output of location D is at least one of the inputs of location E. And, lastly, the output of location E is at least one of the inputs of location F, where finished goods are ultimately produced. All the manufacturing sub-processes performed at the various locations A-E are directed toward manufacturing or converting the raw materials into finished products at location F. Although the manufacturing process 10 is illustrated in FIG. 1 as a linear manufacturing process, the manufacturing process may include batch, parallel, or other known manufacturing processes.

Along the various locations A-E of the manufacturing process 10, semi-finished goods, byproducts or waste may be produced as a natural outcome of the manufacturing sub-processes performed at these locations. The semi-finished goods, byproducts, or waste may be collected at stations 14, which are located proximate the locations A-E. In one embodiment of this invention, each station 14 includes an RFID reader 20 associated with the station 14, which interrogates a designated RFID interrogation area 30 of station 14, as indicated by the RFID signal generated from the RFID reader 20. One skilled in the art is capable of designing an RFID system capable of interrogating a specific area. The interrogative area 30 is any amount of space that is capable of being interrogated by an RFID reader. The RFID reader 20 may intermittently or continuously interrogate the RFID interrogation area 30, depending on the desired application. In one embodiment of the manufacturing process 10, station 14a receives semi-finished goods, byproducts, or waste from the location A of the manufacturing process 10. Station 14b receives semi-finished goods, byproducts, or waste from the location B of the manufacturing process 10. Station 14c receives semi-finished goods, byproducts, or waste from the location C of the manufacturing process 10. Station 14d receives semi-finished goods, byproducts, or waste from the location D of the manufacturing process 10. Station 14e receives semi-finished goods, byproducts, or waste from the location E of the manufacturing process 10. Station 14f receives finished goods from the location F of the manufacturing process 10. The manufacturing process may include any number of manufacturing sub-processes, performed at any number of locations, and may include any number of RFID interrogation stations 14. Alternatively, one RFID reader may include multiple antennas for interrogating multiple interrogation areas 30. In such an embodiment, the RFID reader could be located remote from the manufacturing line 10, or at any place along the manufacturing line 10 with an antenna or multiple antennas located at each interrogation area 30. Although the RFID readers 20 are illustrated as fixed RFID readers, it is also possible to use mobile or hand held RFID readers known in the art.

Figure 2:
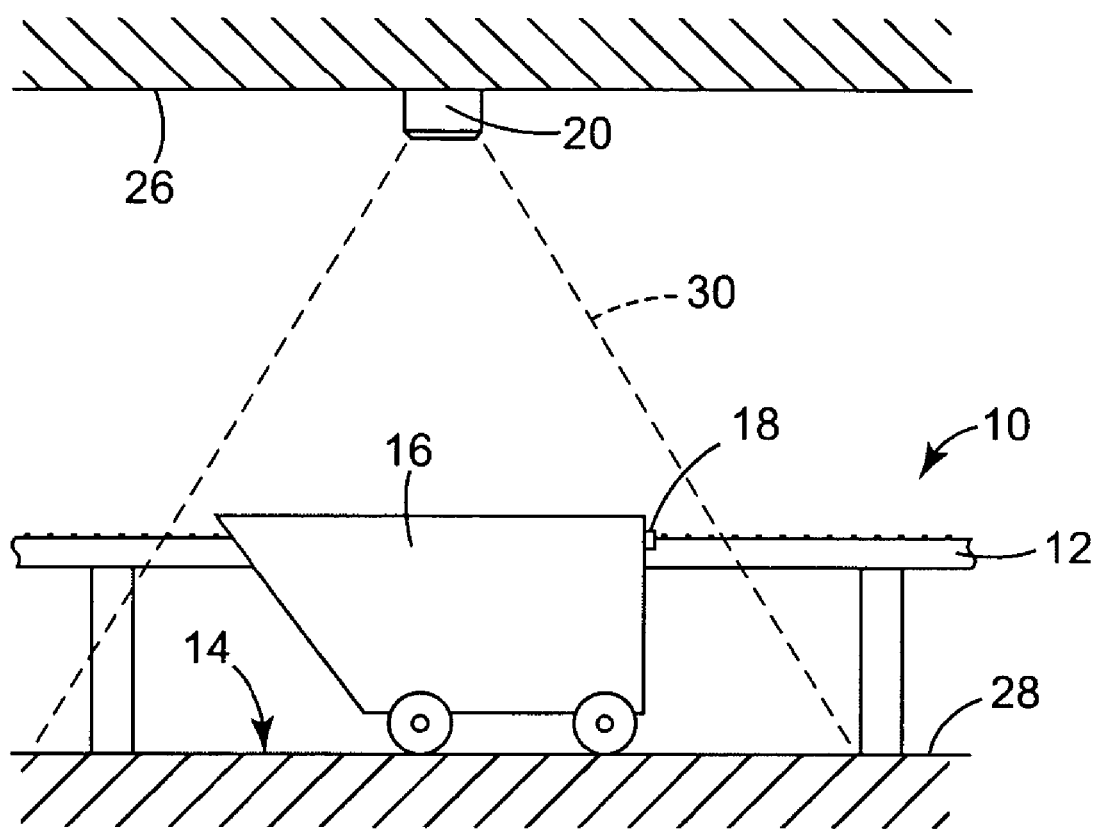
FIG. 2 is a side view of a portion of the manufacturing process, a station having an RFID reader, and the container with an RFID tag that are illustrated in FIG. 1.

Preferably, each station 14 includes at least one container 16 located at the station 14, as illustrated in more detail in FIG. 2. The container 16 includes an RFID tag 18 attached to the container 16. The container may be anything that contains or carries items and/or materials that is known in the art, including, but not limited to pallets, carts, boxes, drums or the like. The RFID tag may be any RFID tag known in the art. In the illustrated embodiment, the container has wheels to allow it to be moved easily throughout the manufacturing floor. An RFID tagged container 16 is preferably located at the station 14 to receive the output of the manufacturing sub-process performed near the station. As mentioned above, the semi-finished goods, byproducts, or waste generated by the steps performed at the location along the manufacturing process 10 are collected into the RFID tagged container 16. Alternatively, just the waste and the byproducts may be collected into the RFID tagged container 16, while the semi-finished goods may continue down the conveyor 12 to the next location in the manufacturing process 10. The manufacturing floor may include any number of RFID tagged containers 16, which may be moved between various locations on the floor.

In the illustrated embodiment, the RFID reader 20 may be mounted on the ceiling 26 directly above the station 14, so it can properly interrogate with its RFID reader antenna the RFID tag 18 mounted on the container 16. Alternatively, the RFID reader 20 or the antennas of the RFID reader 20 may be mounted anywhere proximate the station 14, so long as it can properly interrogate the RFID tag 18 mounted on the container 16 when the container 16 is located within the interrogation area 30 of station 14. The manufacturing floor 28 may include markings to help guide manufacturing personnel to properly locate the container 16 within an area where the RFID tag 18 on the container 16 can be interrogated within the RFID interrogation area 30 of the station 14.

When the RFID reader 20 interrogates the RFID tag 18 on the container 16, it can record the identification number and any other information stored on the RFID tag 18, and through the use of any database known in the art, a computer can identify what container is located at that particular station 14 based on that unique identification number. The RFID reader 20 and accompanying computing device can also record the date and time of the interrogation of the RFID tag 18. If the RFID reader 20 interrogates the RFID tag 18 on the container 16 multiple times, over a length of time, the computing device or a computer can determine what specific containers were located at the various stations 14 at various times, and can calculate the duration of time the containers 16 were at those locations. Other databases may determine what manufacturing sub-processes are performed at the locations affiliated with certain stations 14 during specific dates and times and as a consequence, what byproducts, semi-finished goods, or waste are produced at the location during that same time frame. By combining information gathered by the RFID reader 20 about the RFID tagged containers with information from these other databases, certain conclusions can be made about what types of materials or items are in the RFID tagged containers 16 during certain timeframes. Consequently, manufacturers can use this information to optimize or improve their manufacturing processes or business processes.

The items and/or materials generated from the locations on the manufacturing process 10 may be manually carried by manufacturing personnel to the containers 16 at the designated station 14, or conveyors or other means known in the art may automatically transport or divert the items and/or materials to the containers 16 at the designated stations 14.

FIG. 1 also illustrates optional weigh stations, $W_1$ and $W_2$, located on the manufacturing floor. Each weigh station preferably includes a scale 24, an RFID reader 20, and a designated RFID interrogation area 30. The RFID reader 20 and interrogation area 30 are similar to those readers and areas described above. In one embodiment, after at least a portion of the RFID tagged containers 16 are filled with items and/or materials coming off the manufacturing process 10, the manufacturing personnel may transport the RFID tagged container 16 to one of the weigh stations $W_1$ and $W_2$. Alternatively, the RFID tagged container 16 may be automatically transported to the weigh station by any other means known in the art. At the weigh station W, the weight of the container 16 and the items and/or materials collected inside the container own RFID reader 20 for interrogating the location 32 for the RFID tagged containers 16. Although weigh stations $W_1$ and $W_2$ are illustrated in FIG. 1, other stations are contemplated for measuring or monitoring other physical, chemical or biological properties of the items and/or materials in the RFID tagged container 16.

Information may be recorded using the RFID-based system illustrated in FIGS. 1 and 2 and described above. For example, the following information may be recorded:

| Location | Container I.D. Number | Status | Date and Time | Container Contents | Status | Date and Time | Weight |
|---|---|---|---|---|---|---|---|
| A (14a) | 12345 | Arrived | Aug. 25; 8:35 a.m. | Waste | Departed | Aug. 25; 9:35 a.m. | |
| A (14a) | 23456 | Arrived | Aug. 25; 9:37 a.m. | Waste | Departed | Aug. 25; 10:37 a.m. | |
| D (14d) | 45678 | Arrived | Aug. 25; 1:40 p.m. | Semi-finished goods | Departed | Aug. 25; 3:40 p.m. | |
| F (14f) | 78910 | Arrived | Aug. 25; 4:00 p.m. | Finished goods | Departed | Aug. 25; 7:00 p.m. | |
| Weigh Station $W_1$ | 12345 | Arrived | Aug. 25; 9:40 a.m. | Waste | Departed | Aug 25; 9:50 a.m. | 804 kg. |
| Waste Station (32a) | 12345 | Arrived | Aug. 25; 10:00 a.m. | Waste | Emptied | Aug 25; 10:10 a.m. | |
| Weigh Station $W_1$ | 23456 | Arrived | Aug. 25; 10:45 a.m. | Waste | Departed | Aug 25; 11:10 a.m. | 600 kg. |
| Waste Station (32a) | 23456 | Arrived | Aug. 25; 11:15 a.m. | Waste | Emptied | Aug 25; 11:20 a.m. | |
| Weigh Station $W_2$ | 45678 | Arrived | Aug. 25; 4:00 p.m. | Semi-finished goods | Departed | Aug. 25; 4:10 p.m. | 550 kg. |
| Temporary Storage (32b) | 45678 | Arrived | Aug. 25; 4:11 p.m. | Semi-finished goods | Departed | Aug. 26; 9:00 a.m. | |

16 is recorded. Alternatively, a weigh station W may be located at each station 14. This weight may be manually or automatically recorded. By knowing the weight of the container, it is possible to calculate the weight of the items and/or materials inside the container by subtracting the known weight of the container from the recorded weight of the container and items and/or materials inside the container. The weight of the items and/or materials inside the container may be recorded in any known database. Other databases may provide information about what materials or items are inside the container, or the manufacturing personnel may record what is inside the container 16. Meanwhile, the RFID reader 20 interrogates the RFID interrogation area 30 of the weigh station to identify the specific container by its unique identification number stored on the RFID tag, the time when the interrogation took place, and the length of time the container was within the RFID interrogation area 30 of the weigh station.

After the container 16 has been weighed at the weigh station W, the container 16 may be taken to another location 32 associated with the manufacturing floor. This location 32 may serve various purposes. For example, location 32 may be a waste-receiving area 32a. If the contents of the container 16 are waste generated by the manufacturing process 10, then the contents of the container 16 may be emptied into the waste-receiving area 32a. Alternatively, location 32b may be a temporary storage area for receiving semi-finished goods or byproducts generated by the manufacturing process 10. However, locations 32 may serve any purpose suitable for the manufacturer. The locations 32a, 32b, may also include their The table above illustrates what occurred on the manufacturing floor on the day of August $25^{th}$. At 8:35 a.m., RFID tagged container 16 having identification number 12345 arrived at station 14a, which is affiliated with location A of the manufacturing process 10. The container 12345 was filled with waste generated by the manufacturing sub-processes performed at location A until container 12345 left location A at 9:35 a.m. Container 12345 arrived at the weigh station $W_1$ at 9:40 a.m., just 5 minutes after it left location A. Container 12345 was located in the waste station $W_1$ for 10 minutes, during which time the contents of the RFID tagged container were weighed at 804 kilograms. Lastly, container 12345 was transported to waste station 32a where it arrived at 10:00 a.m. and left at 10:10 a.m. It can be assumed that the 804 kg. of waste in container 12345 was dumped into the waste station 32a, and the container, now empty, was transported to another location thereafter. It is possible to combine this information with information from other manufacturing-related databases that identify what type of waste may have been generated at location A of the manufacturing process between 8:35 a.m. and 9:35 a.m. on August $25^{th}$, and over time, this combined information could be used to ultimately optimize or modify the manufacturing process.

A second RFID tagged container 16 with identification number 23456 arrived at station 14a affiliated with location A, just two minutes after container 12345 left location A. Container 23456 was also filled with waste generated by location A for one hour, after which it departed location A at 10:37 a.m. Next, container 23456 was transported to waste station $W_1$ at 10:45 a.m., just 8 minutes after it left location A.

Container 23456 was located in the waste station $W_1$ for 25 minutes, during which time the contents of the RFID tagged container were weighed at 600 kilograms. Lastly, container 23456 was transported to waste station 32a, where it arrived at 11:15 a.m., was emptied, and departed at 11:20 a.m. It can be assumed that the 600 kg. of waste in container 23456 was dumped into waste station 32a, and the container, now empty, was transported to another location thereafter.

RFID tagged container 16 with identification number 45678 arrived at station 14d affiliated with location D at 1:40 p.m. Container 45678 was filled with semi-finished goods for 2 hours until it left at 3:40 p.m. Next, container 45678 was transported to weigh station $W_2$ where it arrived at 4:00 p.m. Container 45678 was weighed at 550 kilograms and then departed the weigh station $W_2$ at 4:10 p.m. Finally, container 45678 was transported to the temporary storage area 32b where it arrived at 4:11 p.m. and did not leave the area 32b until 9:00 a.m. the next day. Presumably, the semi-finished goods were left in the container while it was stored temporarily, and later the container and contents of the container were returned together to the manufacturing floor the next day.

Lastly, RFID tagged container 16 with identification number 78910 arrived at station 14f affiliated with location F of the manufacturing process 10 at 4:00 p.m. Container 78910 was filled with finished goods produced at location F until 7:00 p.m., after which it was transported to another location.

Figure 3:
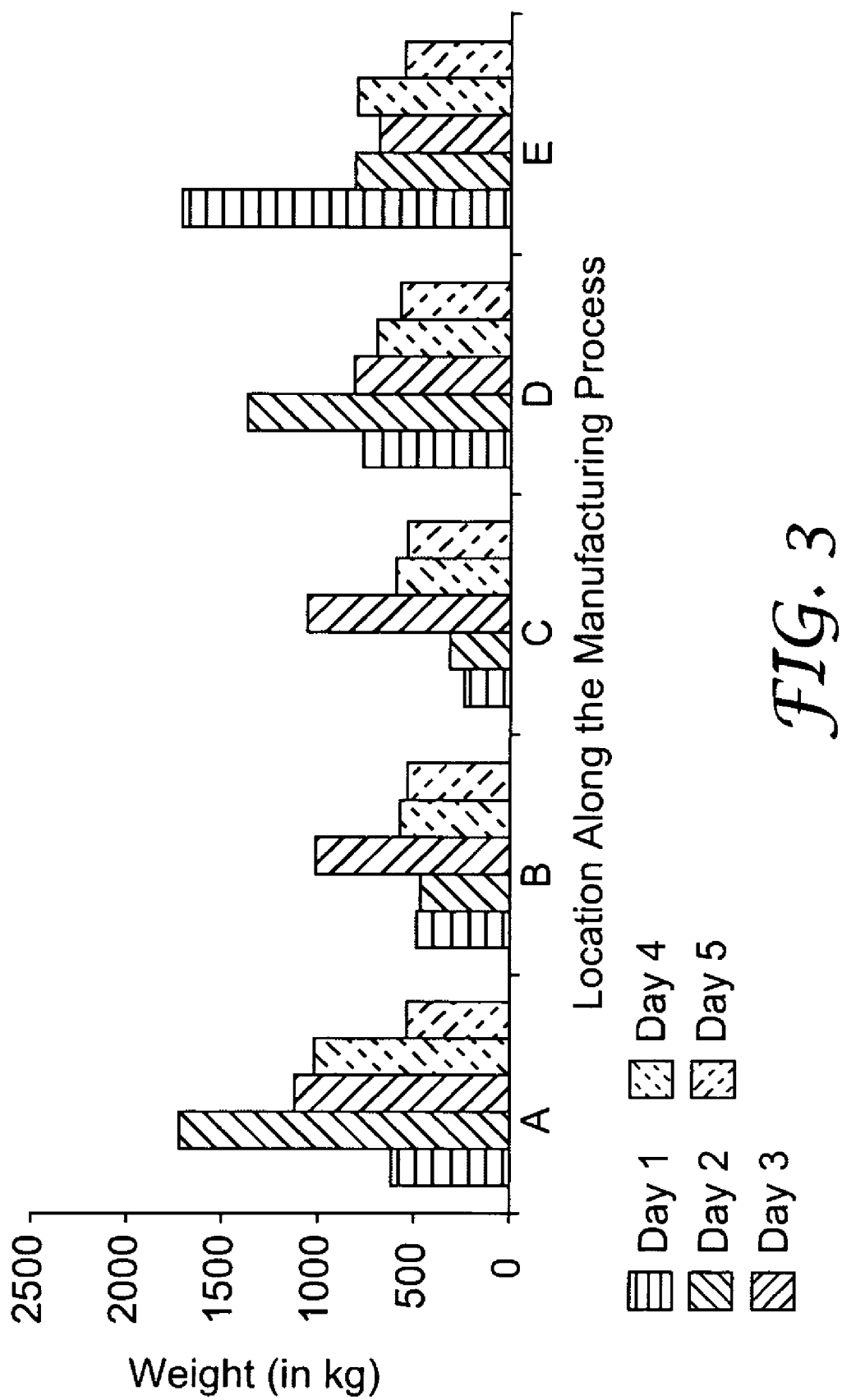
FIG. 3 is a chart illustrating weight of items and/or materials gathered at various stations along the manufacturing process.
Figure 4:
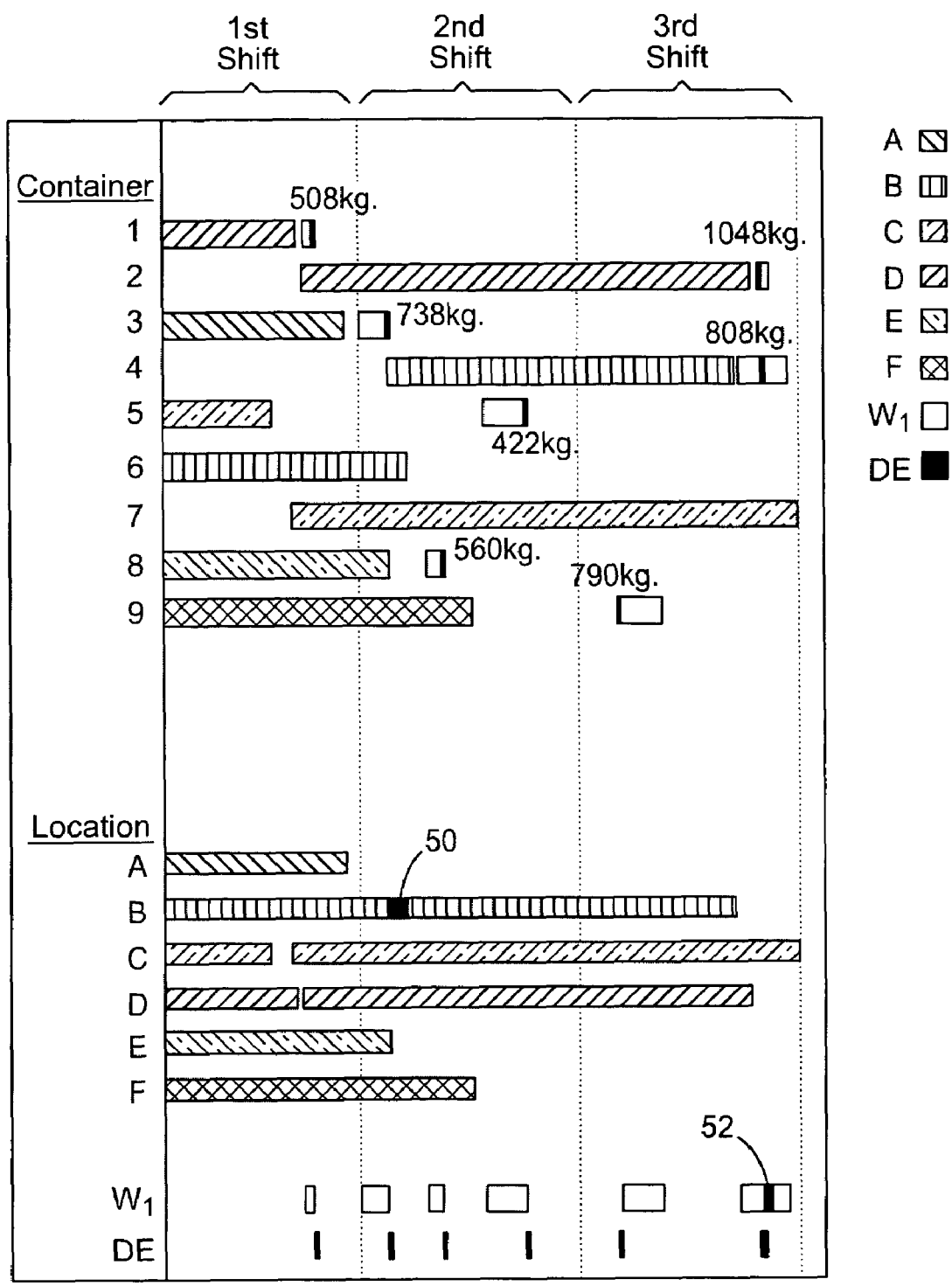
FIG. 4 is a chart illustrating the RFID tagged container and the amount of time each RFID tagged container was located at various locations along the manufacturing process.

The table above illustrates just one possible table that could be generated using the RFID-based system described above in reference to FIGS. 1 and 2. One skilled in the art could contemplate many other ways of capturing and organizing the information obtained for the RFID-based system. For example, FIGS. 3 and 4 illustrate two other possible tables or graphs that could be generated using the information provided by the RFID-based system described above in reference to FIGS. 1 and 2. However, many other tables or graphs may be contemplated by those skilled in the art using the information gathered by the RFID-based system.

FIG. 3 illustrates how much waste, byproducts, or semi-finished goods were collected in the RFID tagged containers 16 over a period of five days. using the weigh stations $W_1$ and $W_2$, the RFID tagged containers 16 may be weighed at different times throughout the day and the contents of the containers 16 are recorded, providing an overall total by location (A-E). It is interesting to note from this example that there is wide variation in the amount of semi-finished products, byproducts, and waste that is generated at each location over a period of days. Such information may be helpful to manufacturers in identifying what variations may exist in their manufacturing process, and eventually help them optimize or improve their manufacturing processes.

FIG. 4 illustrates the location of RFID tagged containers 16 at different locations A-F, and waste station $W_1$ over a period of three shifts on the manufacturing floor. The top portion of the graph illustrates the container identification numbers (1-9) and when they were present at the stations 14 affiliated with the various locations on the manufacturing floor over a period of three shifts of the manufacturing process. For example, both Container 1 and Container 2 were located at location D at two separate times. Container 1 was located at location D during the majority of the 1$^{st}$ shift, whereas Container 2 was located there during a portion of the first shift, all of the second shift, and the majority of the third shift. Containers 4 and 6 were both located at location B at two separate times and for a portion of time, they overlapped and were both present at the same time. This overlap in time where two containers were present at the same station 14 is indicated by the solid black portion along the location portion of the graph designated by reference number 50. Container 3 was present at location A during the first shift. Container 5 was present at location C during a portion of the first shift, and container 7 was present at location C during the most of the rest of the first shift, all of the second shift, and all of the third shift. Container 8 was present at location E for the entire first shift and a small portion of the second shift. And lastly, container 9 was present at location F for the entire first shift and approximately half of the second shift.

At the end of their duration at the stations 14, the majority of the containers were then transported to weigh stations $W_1$, weighed and then dumped into the waste receiving area 32a. For example, Container 1 and its contents weighed 508 kgs. Container 2 and its contents weighed 1048 kgs. The time that the containers were located in the weigh station is indicated by the white boxes and their actual weight is recorded next to the white portions on the top of the graph. When the items and/or materials in the containers were dumped in the waste receiving area 32a is indicated by the black solid portions of the graph. When two containers were located at the weigh station $W_1$, as was the case with container 2 and container 4, that period of time is indicated by reference number 52.

The bottom portion of the graph illustrates the total time over a period of three shifts when an RFID tagged container 16 was present at the station affiliated with a location on the manufacturing process 10, regardless of the total number of containers 16. When there was more than one container 16 present at the station 14, the line is illustrated in solid black portion 50.

The table included above and FIGS. 3 and 4 illustrates just some of the information that could be gathered by the RFID-based system illustrated in FIGS. 1 and 2. The RFID-based system is directed at providing manufacturers accurate data or information about the items and/or materials being generated by or used by their manufacturing processes, particularly raw materials, finished goods, waste, byproducts, and semi-finished goods, and the work flow or movements of these items and/or materials throughout the manufacturing environment. Over time, certain trends can be identified and manufacturers can use this knowledge to help improve or optimize their manufacturing and business processes. For example, a manufacturer may realize that more waste is generated on the third shift at locations A and B, in comparison to other shifts. As a result, the manufacturer may study the manufacturing process on the third shift at those particular locations to help identify what inefficiencies are occurring and then try to fix them. As another example, a manufacturer may realize that multiple containers 16 are being located at the same location (as indicated by reference numbers 50 and 52 in FIG. 4), and an alert may be issued to the manufacturing personnel. The RFID-based system may direct manufacturing personnel to take a particular RFID tagged container 16 to a specific location, or issue an alert, for example, if the manufacturing personnel takes the RFID tagged container 16 to the wrong location. The RFID-based system can provide data about a plethora of processes or process steps from which it can be determined if standard operating procedures affiliated with the manufacturing processes are being followed or not. For example, consider the hypothetical of RFID tagged containers with items and/or materials in them that have been located in temporary storage areas for inappropriate or extended periods of time. By providing the RFID-based system and the information it supplies, information is readily available to the manufacturer about such containers and their contents, so that appropriate decisions can be made about what to do with or what action to take relative to the items and/or materials in such containers.

All of these scenarios and others contemplated by those skilled in the art may be addressed by the RFID based system described above.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A method of monitoring items and/or materials from a manufacturing process, comprising the steps of:
   providing a manufacturing process, wherein the manufacturing process includes a plurality of stations associated with different portions of the manufacturing process, wherein each station includes a radio frequency identification ("RFID") reader associated with the station;
   providing a plurality of RFID tagged containers, wherein each container has an associated RFID tag;
   locating at least one of the RFID tagged containers at least at one of the stations;
   filling at least a portion of the RFID tagged container with items and/or materials generated from the manufacturing process;
   interrogating the RFID tagged container with the RFID reader associated with the station to at least record the location of the station where the RFID tagged container is located, and recording the time of the interrogation;
   in response to interrogating the RFID tagged container, obtaining information about the items and/or materials that were placed in the RFID tagged container at the station; and
   based on the obtained information, deciding what action to perform with the items and/or materials in the RFID tagged container.

2. The method of claim 1, wherein the manufacturing process is a first manufacturing process for manufacturing a first finished good and the plurality of stations are for receiving semi-finished goods, byproducts, or waste generated from the manufacturing process, and wherein the filling step comprises:
   filling at least a portion of the RFID tagged container with at least a semi-finished good, byproduct, or waste generated from the manufacturing process at the station.

3. The method of claim 2, wherein the filling step comprises:
   filling at least a portion of the RFID tagged container with semi-finished goods generated from the first manufacturing process; and
   wherein the deciding step comprises:
      transporting the semi-finished goods to temporary storage.

4. The method of claim 2, wherein the filling step comprises:
   filling at least a portion of the RFID tagged container with byproducts generated from the first manufacturing process; and
   wherein the deciding step comprises:
      transporting the byproducts to a second manufacturing process that is for manufacturing a second finished good, where the byproducts from the first manufacturing process may be used as raw materials in the second manufacturing process.

5. The method of claim 2, wherein the filling step comprises:
   filling at least a portion of the RFID tagged container with waste generated from the first manufacturing process; and
   wherein the deciding step comprises:
      weighing the waste in the RFID tagged container, recording the weight, and emptying the RFID tagged container.

6. The method of claim 1, wherein the interrogation step further includes recording the date the RFID tagged container was located at the station.

7. The method of claim 1, further comprising the step of notifying a user of where to take the items and/or materials in the RFID tagged container after it leaves the station.

8. The method of claim 7, further comprising the step of issuing an alert, if the user takes the RFID tagged container to a wrong location.

9. The method of claim 1, further comprising the step of issuing an alert, if one of the plurality of stations contains an incorrect number of RFID tagged containers.

10. The method of claim 1, wherein the deciding step comprises transporting the RFID tagged container to another location.

11. The method of claim 1,
   wherein filling comprises filling at least a portion of the RFID tagged container with at least one of a byproduct or waste generated by the manufacturing process, and
   wherein deciding comprises transporting the RFID tagged container to a second manufacturing process, wherein the second manufacturing process may use the byproduct or waste in the RFID tagged container as a raw material or a semi-finished product for use in manufacturing a product.

12. A method for tracking semi-finished goods, byproducts of the manufacturing process, or waste from a manufacturing process, comprising the steps of:
   providing a first manufacturing process for manufacturing a first finished good, wherein the manufacturing process includes a plurality of stations for receiving semi-finished goods, byproducts, or waste generated from the manufacturing process, wherein each station includes, a radio frequency identification ("RFID") reader associated with the station;
   providing a plurality of RFID tagged containers, wherein each container has an associated RFID tag;
   locating at least one of the RFID tagged containers at least at one of the stations;
   filling at least a portion of the RFID tagged container with at least a semi-finished good, byproduct, or waste generated from the manufacturing process at the station;
   interrogating the RFID tagged container with the RFID reader at the stations;
   in response to interrogating the RFID tagged container, obtaining information about the goods, byproducts or waste in the RFID tagged container; and
   based on the obtained information, deciding what action to perform with the semi-finished goods, byproducts, or waste in the RFID tagged containers.

13. The method of claim 12, wherein the filling step comprises:
   filling at least a portion of the RFID tagged container with semi-finished goods generated from the first manufacturing process; and wherein the deciding step comprises:
transporting the semi-finished goods to temporary storage.

14. The method of claim 13, wherein the filling step comprises:
filling at least a portion of the RFID tagged container with byproducts generated from the first manufacturing process; and
wherein the deciding step comprises:
transporting the byproducts to a second manufacturing process that is for manufacturing a second finished good, where the byproducts from the first manufacturing process may be used as raw materials in the second manufacturing process.

15. The method of claim 13, wherein the filling step comprises:
filling at least a portion of the RFID tagged container with waste generated from the first manufacturing process; and
wherein the deciding step comprises:
weighing the waste in the RFID tagged container, recording the weight and
emptying the RFID tagged container.

16. The method of claim 12, wherein the interrogation step further includes recording the date the RFID tagged container was located at the station.

17. The method of claim 12, further comprising the step of notifying a user of where to take the items and/or materials in the RFID tagged container after it leaves the station.

18. The method of claim 17, further comprising the step of issuing an alert if the user takes the RFID tagged container to a wrong location.

19. The method of claim 12, further comprising the step of issuing an alert, if one of the plurality of stations contains an incorrect number of RFID tagged containers.

20. The method of claim 12, further comprising the step of transporting the RFID tagged container to another location.

21. The method of claim 12,
wherein filling comprises filling at least a portion of the RFID tagged container with at least one of a byproduct or waste generated by the manufacturing process, and
wherein deciding comprises transporting the RFID tagged container to a second manufacturing process, wherein the second manufacturing process may use the byproduct or waste in the RFID tagged container as a raw material or a semi-finished product for use in manufacturing a product.

22. A method of monitoring items and/or materials from a manufacturing process, comprising the steps of:
providing a manufacturing process, wherein the manufacturing process includes a plurality of stations associated with different portions of the manufacturing process, wherein each station includes a radio frequency identification ("RFID") reader associated with the station;
providing a plurality of RFID tagged containers, wherein each container has an associated RFID tag;
locating, at least one of the RFID tagged containers at least at one of the stations;
filling at least a portion of the RFID tagged container with items and/or materials generated from the manufacturing process at the station;
interrogating the RFID tagged container with the RFID reader associated with the station to at least record the location of the station where the RFID tagged container is located, and recording the time of the interrogation;

in response to interrogating the RFID tagged container, obtaining information about the items and/or materials that were placed in the RFID tagged container at the station;
repeating the interrogating and obtaining steps multiple times to gather data over a length of time; and
using the data to optimize or improve the manufacturing process.

23. The method of claim 22, wherein the manufacturing process is a first manufacturing process for manufacturing a first finished good and the plurality of stations are for receiving semi-finished goods, byproducts, or waste generated from the manufacturing process, and wherein the filling step comprises:
filling at least a portion of the RFID tagged container with at least a semi-finished good, byproduct, or waste generated from the manufacturing process.

24. The method of claim 23, wherein the filling step comprises:
filling at least a portion of the RFID tagged container with semi-finished goods generated from the first manufacturing process; and
wherein the deciding step comprises:
transporting the semi-finished goods to temporary storage.

25. The method of claim 23, wherein the filling step comprises:
filling at least a portion of the RFID tagged container with byproducts generated from the first manufacturing process; and
wherein the deciding step comprises:
transporting the byproducts to a second manufacturing process that is for manufacturing a second finished good, where the byproducts from the first manufacturing process may be used as raw materials in the second manufacturing process.

26. The method of claim 23, wherein the filling step comprises:
filling at least a portion of the RFID tagged container with waste generated from the first manufacturing process; and
wherein the deciding step comprises:
weighing the waste in the RFID tagged container, recording the weight, and emptying the RFID tagged container.

27. The method of claim 22, wherein the interrogation step further includes recording the date the RFID tagged container was located at the station.

28. The method of claim 22, further comprising the step of notifying a user of where to take the items and/or materials in the RFID tagged container after it leaves the station.

29. The method of claim 28, further comprising the step of issuing an alert, if the user takes the RFID tagged container to a wrong location.

30. The method of claim 22, further comprising the step of issuing an alert, if one of the plurality of stations contains an incorrect number of RFID tagged containers.

31. The method of claim 22, wherein the deciding step comprises transporting the RFID tagged container to another location.

32. The method of claim 22,
wherein filling comprises filling at least a portion of the RFID tagged container with at least one of a byproduct or waste generated by the manufacturing process, and
wherein deciding comprises transporting the RFID tagged container to a second manufacturing process, wherein the second manufacturing process may use the byproduct or waste in the RFID tagged container as a raw material or a semi-finished product for use in manufacturing a product.

33. A method comprising:

performing a plurality of processes, wherein each process is performed by one of a plurality of processing stations, and wherein at least one of the processing stations includes a radio frequency identification (RFID) reader;

placing output of at least one of the processing stations into a container that includes an RFID tag, wherein the output is at least one of a byproduct or waste;

interrogating the RFID tag of the container with the RFID reader to record the location of the station where the container is located and the time of the interrogation;

in response to interrogating the RFID tagged container, obtaining information about the output that was placed in the container; and based on the obtained information, determining an action to perform with the output, wherein the action is not disposal.

* * * * *

UNITED STATES PATENT AND TRADEMARK OFFICE
CERTIFICATE OF CORRECTION

| | | |
|---|---|---|
| PATENT NO. | : 7,411,500 B2 | Page 1 of 1 |
| APPLICATION NO. | : 11/226102 | |
| DATED | : August 12, 2008 | |
| INVENTOR(S) | : Michael E. Hamerly | |

It is certified that error appears in the above-identified patent and that said Letters Patent is hereby corrected as shown below:

Column 17
Line 22, In Claim 15, after "weight" insert -- , --.

Signed and Sealed this

Eighth Day of December, 2009

David J. Kappos
*Director of the United States Patent and Trademark Office*